United States Patent [19]

Probst et al.

[11] Patent Number: 4,918,135

[45] Date of Patent: Apr. 17, 1990

[54] PROCESS FOR THE PREPARATION OF AQUEOUS POLYMER DISPERSIONS THE DISPERSIONS OBTAINED BY THE PROCESS AND THEIR USE FOR THE PRODUCTION OF COATINGS

[75] Inventors: Joachim Probst, Leverkusen; Walter Schäfer, Leichlingen; Klaus Schuster, Leverkusen; Heinrich Alberts, Odenthal; Hanns P. Müller, Bergisch-Gladbach; Adolf Schmidt; Wolfhart Wieczorrek, both of Cologne, all of Fed. Rep. of Germany

[73] Assignee: Bayer Aktiengesellschaft, Leverkusen, Fed. Rep. of Germany

[21] Appl. No.: 335,816

[22] Filed: Apr. 10, 1989

[30] Foreign Application Priority Data

Apr. 23, 1988 [DE] Fed. Rep. of Germany ....... 3813840

[51] Int. Cl.⁴ ............................................. C08K 5/16
[52] U.S. Cl. .................................... 524/714; 524/852; 524/457; 526/217
[58] Field of Search ....................... 524/714, 852, 457; 526/217

[56] References Cited

U.S. PATENT DOCUMENTS 4,431,689 2/1984 Günter ............................ 427/388.2

Primary Examiner—Joseph L. Schofer
Assistant Examiner—John J. Guarriello
Attorney, Agent, or Firm—Connolly and Hutz

[57] ABSTRACT

An improved coating for heat resistant substrates is an aqueous dispersion of polymers prepared by polymerization of olefinically unsaturated monomers in an aqueous medium in the presence of radical formers and emulsifiers, wherein the emulsifiers are polyisocyanate addition products having a molecular weight below 20,000 and containing from 5 to 1000 milliequivalents of anionic structures corresponding to the following formula

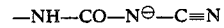

$$-NH-CO-N^{\ominus}-C\equiv N$$

incorporated therein per 100 g of solids content.

4 Claims, No Drawings

PROCESS FOR THE PREPARATION OF AQUEOUS POLYMER DISPERSIONS THE DISPERSIONS OBTAINED BY THE PROCESS AND THEIR USE FOR THE PRODUCTION OF COATINGS

This invention relates to a new process for the preparation of aqueous dispersions of polymers of olefinically unsaturated monomers in the presence of radical formers and of certain anionically modified polyisocyanate addition products as emulsifiers, to the dispersions obtainable by this process and to their use for the production of coatings.

BACKGROUND OF THE INVENTION

It is known from German Published Application 3,441,934 (U.S. Pat. No. 4,619,966) to prepare solutions or dispersions of polyisocyanate addition products in which anionic structural units of the formula

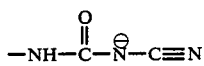

which ensure the solubility or dispersibility in water are incorporated. These solutions or dispersions are prepared by reacting an organic polyisocyanate with ammonium salts of cyanamide. The ammonium salts may be added as such or prepared in situ by using cyanamide with suitable bases. When sheet products produced from these solutions or dispersions are cross-linked by heat, they give rise to water resistant and solvent resistant reaction products or coatings after elimination of the base.

In practice, it has been found that this prior art procedure has certain disadvantages for the production of sheet products or coatings. Those disadvantages include:

the solutions or dispersions tend to foam up;
so called "boiling blisters" are liable to form during the stoving process, depending on the atmospheric conditions;
the production of perfect cross-linked and therefore solvent resistant and water resistant films requires high stoving temperatures of about 180° C.

BRIEF DESCRIPTION OF THE INVENTION

It has now surprisingly been found that stable dispersions which do not have the disadvantageous properties mentioned above and are suitable for the production of high quality coatings which can be cross-linked by heat may be obtained by the emulsion polymerisation in an aqueous medium of olefinically unsaturated monomers, using the above mentioned polyisocyanate addition products as emulsifiers.

DETAILED DESCRIPTION OF THE INVENTION

The present invention therefore relates to a process for the preparation of aqueous dispersions of polymers by the polymerisation of olefinically unsaturated monomers in an aqueous medium in the presence of radical formers and emulsifiers, characterised in that the emulsifiers used are polyisocyanate addition products having a molecular weight below 20,000 in which are incorporated more than 5 and up to 1000 milliequivalents per 100 g of solids content of anionic structural units corresponding to the following formula

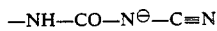

The invention relates to the dispersions obtainable by this process.

Lastly, the invention relates to the use of the dispersions obtainable by this process for the production of coatings on any substrates.

The polyisocyanate polyaddition products which are an essential feature of this invention and are to be used as emulsifiers in the process according to the invention have an average molecular weight (number average) below 20,000, preferably from 500 to 10,000, and contain more than 5 and up to 1000, preferably from 20 to 500, especially from 40 to 400 milliequivalents of anionic structural units of the above formula per 100 g of solids content.

Polyisocyanates suitable for the preparation of these polyisocyanate addition products are, for example, the compounds mentioned in US-PS 4 619 966, column 2, line 55 to column 3, line 42. The isocyanate prepolymers mentioned under (iii) in the above mentioned U.S. Patent are particularly preferred. For the preparation of these isocyanate prepolymers, the polyisocyanates mentioned as Examples or any mixtures of these polyisocyanates are reacted with subequivalent quantities of the polyhydroxyl compounds given as examples or mixtures thereof, for example in an NCO/OH equivalent ratio of from 1.2:1 to 15:1, preferably from 1.5:1 to 12:1. As may be seen from the NCO/OH equivalent ratio, these "isocyanate prepolymers" are in many cases so called "semi-prepolymers", i.e. mixtures of excess, unreacted starting polyisocyanate with true isocyanate prepolymers containing urethane groups. Such "semi-prepolymers" may also be used for the preparation of the emulsifiers to be used according to the invention.

The isocyanate prepolymers, if used, are preferably so chosen that the resulting emulsifiers to be used according to the invention are oligo urethanes containing at least two anionic structural units of the above mentioned type per molecule and having an average molecular weight of from 500 to 10,000. In the context of the present invention, the term "molecular weight" is used to denote the number average molecular weight which can be calculated from the stoichiometry of the starting materials used for the preparation of the emulsifiers.

It would in principle also be possible to use ionically modified starting components of the type known from the chemistry of polyurethane dispersions for the preparation of the polymeric emulsifiers so that polyisocyanate addition products are obtained in which carboxylate or sulphonate groups are incorporated in addition to the anionic structural units of the above mentioned general formula which are required for this invention. This could be achieved, for example, by using isocyanate prepolymers which have been prepared from or with the inclusion of polyhydric alcohols containing carboxylate or sulphonate groups or from the corresponding hydroxycarboxylic acids or hydroxysulphonic acids, followed by neutralization of the acid groups. Such additional ionic groups may contribute to a considerable increase in the dispersing action and stabilizing action of the polymeric emulsifiers for the olefinically unsaturated monomers and for the polymers prepared from them. Such additional ionic groups may also improve the wettability or compatibility of pigments.

For the preparation of the polyisocyanate addition products to be used according to the invention there may also be used organic polyisocyanates of the type exemplified above in which the isocyanate groups are partly blocked with blocking agents for isocyanate groups, such as phenol, ε-caprolactam, diethyl malonate, ethyl acetoacetate or oximes such as cyclohexanone oxime. When such partially blocked polyisocyanates are used for the preparation of the polyisocyanate addition products, the latter must, however, still contain a sufficient number of free isocyanate groups so that the reaction with ammonium salts of cyanamide will give rise to a sufficient number of anionic structural units of the above mentioned formula to ensure the solubility or dispersibility of the polyisocyanate addition products in the solvents or dispersing agents and a sufficient emulsifying action both for the mixture of the olefinically unsaturated monomers and for the dispersions obtained after polymerisation. The polyisocyanate addition products resulting from partially blocked polyisocyanates will, of course, contain blocked isocyanate groups, which may contribute to an even more powerful heat cross-linking of the coatings. Furthermore, a certain proportion of compounds containing additional double bonds in the molecule may be used for the preparation of the polyisocyanate polyaddition products. These compounds with additional double bonds include, for example, hydroxyalkyl esters of methacrylic acid or of acrylic acid, such as acrylic acid-2-hydroxypropyl ester which may be obtained by the chemical addition of propylene oxide to the acid, acrylic acid-2-hydroxyethyl ester, methacrylic acid-2-hydroxypropyl ester which is formed by the chemical addition of propylene oxide to the acid, and methacrylic acid-2-hydroxyethyl ester. Compounds such as 1,1-bis-(allyloxymethyl)-1-hydroxymethyl-propane ("trimethylolpropanediallyl ether"), allyl alcohol, methallyl alcohol, 1-allyloxymethyl-1,1-bishydroxymethyl-propane ("trimethylolpropanemonoallyl ether"), allylamine and methallylamine may also be used.

The latter are particularly suitable for binding the emulsifier covalently to the resulting polymer in the process according to the invention.

The polyisocyanate component used for the preparation of the polyisocyanate addition products generally has an isocyanate content of from 0.1 to 50% by weight, preferably from 4 to 25% by weight.

The emulsifiers are prepared by reacting the polyisocyanates with ammonium salts of cyanamide. These ammonium salts may be used as such or prepared in situ by using cyanamide and suitable bases at the same time. Suitable ammonium salts of cyanamide include those based on (i) ammonia, (ii) primary or secondary amines having a pKb value of at least 3.1, such as methylene, dimethylamine, ethylamine or tert.-butylamine and (iii) any tertiary amines, such as trimethylamine, triethylamine, tripropylamine, dimethylaminoethanol, N-methyldiethanolamine or triethanolamine.

The amines are preferably substances which evaporate or vaporise under the heat treatment of the dispersions obtained in the process according to the invention.

The preparation of polyisocyanate addition products from the above mentioned starting materials is generally carried out in a temperature range of from 0° to 80° C., preferably from 5° to 50° C., in an organic or aqueous medium, preferably with the in situ preparation of the ammonium salts in the reaction mixture. The quantity of cyanamide used is calculated to provide a molar ratio of free isocyanate groups to cyanamide of from 0.5:1 to 1.5:1, preferably from 0.8:1 to 1.2:1. The quantity of base used is calculated to provide at least 0.5 mol, preferably 1 mol of basic nitrogen atoms for each mol of cyanamide which is to be reacted with isocyanate groups. Although an excess of amine may be employed, it is not advantageous. The reaction between the isocyanate groups of the polyisocyanate component and the ammonium salts proceeds in accordance with the following equation:

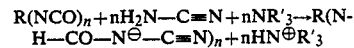

$$R(NCO)_n + nH_2N-C\equiv N + nNR'_3 \rightarrow R(N-H-CO-N^{\ominus}-C\equiv N)_n + nHN^{\oplus}R'_3$$

In this equation, R stands for the inert group of the n-functional polyisocyanate and R' stands for hydrogen or the inert organic group of the base.

The preparation of the polyisocyanate addition products may be carried out according to several variations, for example the following:

1. An organic polyisocyanate or a mixture of organic polyisocyanates of the type exemplified above is reacted in the form of a liquid or a solution in an organic solvent with a mixture of cyanamide and the required base and the resulting reaction product, optionally free from solvent, is dissolved or dispersed in water, optionally with subsequent removal of the solvent from the solution or dispersion by distillation. Examples of suitable solvents include in particular water miscible solvents such as acetone, methanol, ethanol, methylethyl ketone or N-methylpyrrolidone as well as solvents which are incompatible with water, such as ethyl acetate, n-butanol or toluene. When such solvents which are immiscible with water are used, however, their quantity must be limited so that homogeneous solutions or dispersions of polyisocyanate addition products are obtained.

2. An organic polyisocyanate or a mixture of organic polyisocyanates of the type exemplified under (i) or (ii) of US-PS 4 619 966 is mixed with a subequivalent quantity of a polyhydroxyl compound of the type exemplified under (iii) of US-PS 4 619 966 or of a mixture of such compounds and a cyanamide and a base, optionally in the presence of an inert solvent of the type exemplified above. Both the isocyanate prepolymer and the ammonium salt of the cyanamide and base are prepared in situ and their subsequent reaction is carried out by a one-shot process followed by working up of the reaction mixture as described under 1.

3. A polyisocyanate or polyisocyanate mixture optionally dissolved in an inert solvent of the type exemplified above is added to an aqueous solution of the ammonium salt of the cyanamide, optionally followed by distillative removal of the auxiliary solvent.

It is to be understood that the alcohols given in the list of suitable solvents cannot be used as solvents for the polyisocyanate component but only as solvents for the cyanamide and the base, i.e. the ammonium salt of cyanamide. If such solutions in alcoholic solvents are reacted with the polyisocyanates, the alcoholic hydroxyl groups do not interfere with the reaction since the salts of cyanamide react much more rapidly with the isocyanates than the alcoholic hydroxyl groups of the solvent.

Solutions or dispersions of the polyisocyanate addition products in the aqueous or aqueous-organic solvents or dispersing agents are obtained in all the cases mentioned. As to whether the substances obtained are solutions or dispersions, this depends on the molecular weight of the polyisocyanate used and on the proportion of anionic groups present in the reaction products. The solids content of the solutions or dispersions is generally from 5 to 95% by weight, preferably from 20 to 80% by weight.

The process according to the invention, i.e. the polymerisation of the olefinically unsaturated monomers, is carried out by the conventional methods of emulsion polymerisation in the presence of the above described polyisocyanate addition products which may be used in the form of their aqueous solutions or dispersions in which they are originally obtained in the process of their preparation. The ratio by weight of olefinically unsaturated monomers to the emulsifiers required for the invention is from 0.1:1 to 20:1 in the process according to the invention, preferably from 0.5:1 to 10:1, most preferably from 0.5:1 to 4:1.

The following are mentioned as examples of olefinically unsaturated monomers:

(a) $\alpha,\beta$-olefinically unsaturated monocarboxylic acids containing 3 to 5 carbon atoms and their esters or nitriles and amides such as acrylic, methacrylic or crotonic acid. Acrylic and methacrylic acid amides, acrylo and methacrylonitrile, esters of acrylic and methacrylic acid, in particular those of saturated monohydric aliphatic or cycloaliphatic alcohols containing 1 to 20 carbon atoms, such as the esters of the above mentioned acids with methyl, ethyl, propyl, isopropyl, n-butyl, isobutyl, hexyl, 2-ethylhexyl, octyl or stearyl alcohol, cyclohexanol or methyl cyclohexanol, or with benzyl alcohol, phenol, cresol or furfuryl alcohol. Monoesters of $\alpha,\beta$-monoolefinically unsaturated monocarboxylic acids containing 3 or 4 carbon atoms with dihydric, saturated aliphatic alcohols containing 2 to 4 carbon atoms, such as 2-hydroxyethyl methacrylate, 2-hydroxypropyl methacrylate, 4-hydroxybutyl methacrylate, 2-hydroxyethyl acrylate, 2-hydroxypropyl acrylate or 4-hydroxybutyl acrylate; glycidyl esters of acrylic and methacrylic acid, such as glycidyl (meth)acrylate; and aminoalkyl esters and aminoalkylamides of acrylic and methacrylic acid, such as 2-aminoethyl-(meth)acrylic hydrochloride, N,N-dimethylaminoethyl-(meth)acrylate and N,N-dimethylaminopropyl acrylamide.

Monomers containing two or more double bonds in the molecule may also be used, e.g. ethylene glycol diacrylate or ethylene glycol dimethacrylate. Highly branched or cross-linked polymer particules, so called microgels, may be obtained from such monomers.

(b) $\alpha,\beta$-olefinically unsaturated dicarboxylic acids containing 3 to 5 carbon atoms and derivatives of these acids, e.g. fumaric acid, maleic acid, itaconic acid and mono and diesters of the above mentioned dicarboxylic acids containing 1 to 18 carbon atoms in the alcohol moiety, such as dimethyl maleate, diethyl maleate, dibutyl maleate, monohexyl maleate or monocyclohexyl maleate.

(c) Mono and diesters of vinyl alcohol with carboxylic acids or with hydrohalic acids, vinyl ethers, vinyl ketones and vinylamides, such as vinyl acetate, vinyl propionate, vinyl laurate, vinyl stearate, vinyl benzoate, chlorovinyl acetate, divinyl adipate, vinyl chloride, vinylidene chloride, vinylethyl ether, vinylbutyl ether, vinylethyl ether or vinyl isobutyl ether, vinylethyl ketone, vinylformamide and N-vinyl acetamide.

(d) Vinyl compounds of aromatic compounds and heterocyclic compounds, such as styrene, $\alpha$-methylstyrene, vinyl toluene, p-chlorostyrene, divinyl benzene, 2-vinyl pyrrolidone or 2-vinyl pyridine.

(e) N-methylol ethers of acrylic and methacrylic acid amide corresponding to the following general formula I

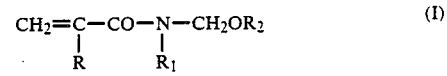

in which R stands for hydrogen or methyl, $R_1$ stands for hydrogen, alkyl, aralkyl or aryl, and $R_2$ stands for alkyl or cycloalkyl, e.g. methyl, ethyl, n-propyl, isopropyl, n-butyl, isobutyl or cyclohexyl (see DE-B-1 035 363) as well as unetherified N-methylol compounds of acrylic and methacrylic acid amide.

(f) Mannich bases of acrylic and methacrylic acid amide corresponding to the following general formula II

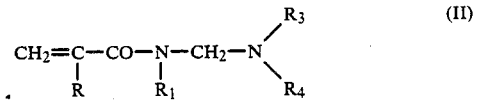

wherein R and $R_1$ have the same meanings as in formula I and $R_3$ and $R_4$ stand for alkyl or cycloalkyl or together represent a heterocyclic group such as the morpholine group. Suitable compounds of this type are mentioned in DE-B-1 102 404.

(g) Acrylic and methacrylic acid derivatives terminated with a halogenomethyl carbonyl group as represented by the following general formula III:

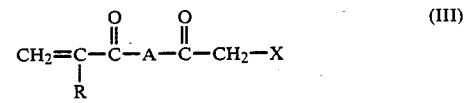

R = H, CH$_3$

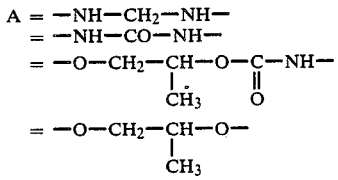

X = Cl, Br (see BE-A-696 010).

(h) Allyl compounds such as triallyl cyanurate, triallyl phosphate, allyl alcohol or allylamine.

(i) Monoolefinically unsaturated aliphatic hydrocarbons containing 2 to 6 carbon atoms, such as ethylene, propylene, butylene or isobutylene.

(j) Conjugated diolefines containing 4 to 6 carbon atoms, such as butadiene, isoprene, 2,3-dimethyl butadiene or chlorobutadiene.

(k) Norbornene and hydroxymethyl norbornene.

The following are preferably used: acrylic and methacrylic acid esters containing 1 to 12 carbon atoms in the alcohol moiety, acrylic acid, methacrylic acid and the $C_2$ to $C_4$ hydroxyalkyl esters of these acids, styrene, acrylo and methacrylonitrile, vinyl acetate, vinyl propionate, vinyl chloride, vinylidene chloride and ethylene or propylene in combination with one or more of the above mentioned monomers.

When carrying out the process according to the invention, it is particularly preferred to use monomer mixtures containing monomers with alcoholic hydroxyl groups of the type mentioned above in such quantities that the monomer mixtures contain 0.5 to 8% by weight of alcoholic hydroxyl groups. Particularly valuable dispersions according to the invntion are obtained when such preferred monomer mixtures are used and when the nature and quantity of the emulsifiers required for the invention are calculated so that the dispersions according to the invention finally obtained have from 0.1 to 10 anionic structural units of the above mentioned formula for each hydroxyl group of the polymers.

Polymerisation is generally carried out at temperatures of from 10° to 150° C., preferably at 40° to 130° C.

The initiators used are generally of the type which decompose into radicals and are used in quantities of from 0.05 to 5% by weight, based on the monomers. Examples of such initiators include organic peroxides such as lauroyl peroxide, cyclohexanonehydro-peroxide, tert.-butyl-peroctoate, tert.-butyl-perpivalate, tert.-butyl-perbenzoate, dichlorobenzoyl peroxide, benzoyl peroxide, di-tert.-butyl peroxide, tert.-butylhydro peroxide and cumene hydroperoxide; peroxy carbonates such as di-isopropyl-peroxy dicarbonate, dicyclohexyl-peroxy dicarbonate and diisooctyl-peroxy dicarbonate; sulphonyl peroxides such as acetyl-cyclohexyl-sulphonyl peracetate; sulphonyl hydrazides, azo compounds such as 4,4'-azo-bis-(4-cyanopentane carboxylic acid), azo-diiso-butyric acid dinitrile and water soluble azo compounds as described e.g. in DE-A-2 841 045.

Inorganic peroxides such as hydrogen peroxide, potassium peroxydisulphate and ammonium peroxydisulphate are also suitable.

The initiators which decompose into radicals may be used alone or in combination with reducing agents or heavy metal compounds. Examples of such compounds include sodium and potassium pyrosulphite, formic acid, ascorbic acid, thiourea, hydrazine derivatives and amine derivatives and rongalite. The heavy metal compounds may be both in an oil soluble form and in a water soluble form. Examples of water soluble heavy metal compounds include silver nitrate, halides or sulphates of divalent or trivalent iron, cobalt, nickel, and salts of titanium or vanadium in their lower valency stages.

Examples of oil soluble heavy metal compounds include cobalt naphthenate and the acetyl acetone complexes of vanadium, cobalt, titanium, nickel or iron.

The polymerisation is generally carried out at pH values of from 5 to 10, preferably 6 to 9. If acid groups are present in the reaction mixture, adjustment of the pH to values within these ranges is frequently carried out by the addition of aqueous ammonia.

The usual regulators may be used to regulate the molecular weights of the polymers, e.g. n-dodecyl mercaptan, t-dodecyl mercaptan, diisoprpylxanthogen di-sulphide, thioglycol and thioglycerol. They are generally added in quantities of from 0.1 to 2% by weight, based on the monomer mixture.

Emulsion polymerisation in an aqueous medium may be carried out by known polymerisation processes, either batchwise or continuously or by the inflow process.

The continuous process and the inflow process are particularly preferred. In the latter process, water together with part or all of the emulsifier system and optionally part of the monomer mixture are introduced into the reaction vessel under a nitrogen atmosphere and heated to the polymerisation temperature and the monomer mixture and the initiator and optionally emulsifier are added dropwise over a period of 0.5 to 10 hours, preferably 1 to 6 hours.

The reaction mixture is reactivated after some time and the reaction is completed to a conversion rate of about 99.0% to 99.9% by weight. Any residues of monomers or any organic solvents still present may be removed after emulsion polymerisation, if necessary with the water present or a part thereof, by distillation under vacuum. A further quantity of water may then be added so that the products finally obtained from the process are in the form of 10 to 60% by weight dispersions, preferably 20 to 50% by weight dispersions.

The average particle diameters determined by a laser scattered light correlation spectroscopy are in the range of from 20 to 1000 nm, preferably from 50 to 500 nm, depending on the reaction conditions. Dispersions having particle sizes below 50 nm appear transparent whereas dispersions of larger particles appear progressively more cloudy.

The dispersions may be mixed with other dispersions of like charge, e.g. dispersions of polyvinyl acetate, polyethylene, polystyrene, polybutadiene, polyvinyl chloride or polyacrylate.

Fillers, plasticisers, pigments, hydrofluoric acid sols and silica sols and dispersions of aluminium, clay or asbestos may also be incorporated.

The products of the process according to the invention are stable, aqueous dispersions in a form suitable for storage and despatch and may be worked up into shaped products at any later date. They generally dry directly to dimensionally stable plastics coats.

If monomers with functional groups, especially hydroxyl and/or carboxyl groups, have been used in the process according to the invention, other, cross-linking substances may be incorporated in the products according to the invention if desired for bringing about additional cross-linking by heat and thus accelerating the process of heat curing. Examples of such additional substances include blocked or free organic polyisocyanates, organic carbodiimides, formaldehyde or substances which split off formaldehyde, melamine resins and methylol compounds and ethers thereof.

Other additives conventionally used in lacquer technology may, of course, also be added to the products of the process according to the invention, e.g. fillers, pigments, levelling agents, deaerating agents and solvents. The dispersions according to the invention may have a liquid or pasty consistency and are stable without the addition of emulsifier but suitable anionic or neutral emulsifiers and protective colloids as well as thickeners may be added in the course of the process, e.g. casein which has been decomposed with ammonia, soaps, invert soaps, alkyl sulphonates, polyvinyl alcohol, ethoxylated phenols, oleyl alcohol polyglycol ethers, ethoxylated polypropylene glycol and natural products such as gelatine, gum arabic, tragacanth or fish glue. Such additives serve mainly to lower the surface tension of the aqueous dispersons; they also influence the stability and the coagulability of these dispersions.

It should be noted, however, that the addition of such emulsifiers, which are conventionally used for emulsion polymerisation, is by no means necessary in the process according to this invention.

The aqueous dispersions obtainable by the process according to the invention are versatile in use. Thus they may be used for the production of dip moulded articles and of foams by the latex mechanical frothing process; coagulates which can be worked up on a mixing roller may be obtained by the addition of electrolytes to the aqueous dispersions and both tack free and tacky films and foils may be obtained by evaporating off the water. The products of the process are suitable for coating or covering and impregnating woven and non-woven textiles, leather, paper, wood, metal, ceramics, stone, concrete, bitumen, hard fibre, straw, glass, porcelain, plastics of various types and glass fibres and for antistatic and crease resistant finishing; they may also be used as binders for non-woven webs, adhesives, bonding agents, backing agents, hydrophobicising agents, plasticisers and binders, e.g. for cork powder or sawdust, glass fibres, asbestos, plastics or rubber waste or ceramic materials, and as auxiliary agents for cloth printing and additives to polymer dispersions; also as sizes and leather finishes.

These dispersions are preferably used for aqueous lacquer systems which are autocross-linked by heat. Cross-linking by heat of the systems according to the invention is generally carried out within the temperature range of from 70° to 170° C., preferably from 100° to 150° C. The dispersions according to the invention are therefore particularly preferred for the formation of coatings on heat resistant substrates.

All percentages given in the following examples are percentages by weight.

EXAMPLES

Emulsifier 1

639 g of a biuret. polyisocyanate based on 1,6-diisocyanatohexane and having an isocyanate content of 23% are added to 297.5 g of a polyester with a molecular weight of 1700 based on adipic acid, hexane diol-(1,6) and neopentyl glycol (ratio by weight of diols=11:6). The reaction mixture is then heated to 120° C. for 2 hours.

900 g of the reaction product (2.9 mol NCO) are added at 10° to 20° C. to a mixture of 121.5 g (2.9 mol) of cyanamide (stabilized with 1% $NaH_2PO_4$) and 258 g (2.9 mol) of N,N-dimethylamino ethanol in 260 ml of tetrahydrofuran so that the temperature does not exceed 25° C.

The reaction mixture is then stirred for 2 to 4 hours at 20° to 25° C. until the isocyanate band has disappeared from the IR spectrum. The polyisocyanate addition product is then dissolved in 900 ml of water. The tetrahydrofuran is driven off by the introduction of nitrogen into the aqueous solution which is heated to 60°-80° C. The aqueous solution left behind has a solids content of 50%, determined by the evaporation of water at 180° C.

Emulsifier 1 has a calculated molecular weight of about 2,200 and contains 227 milliequivalents of structural units of the formula $NH-CO-N^\ominus-C\equiv N$ per 100 g of solids.

Emulsifier 2

500 g of a trimer based on 1,6-diisocyanatohexane and having an isocyanate content of 21% are added to 212.5 g of a polyester with a molecular weight of 1,700 based on adipic acid, hexane diol-(1,6) and neopentyl glycol (ratio by weight of diols=11:6). The reaction mixture is then heated to 120° C. for 2 hours.

The reaction mixture is cooled to 70° C. and then stirred for 2 hours at 70° C. after the addition of 96.3 g of trimethylol propane diallyl ether.

750 g of the reaction product (1.7 mol NCO) are added to a mixture of 71.2 g (1.7 mol) of cyanamide (stabilized with 1% $NaH_2PO_4$) and 151.3 g (1.7 mol) of N,N-dimethylamino ethanol in 150 ml of acetone at 10° to 20° C. at such a rate that the temperature does not rise above 25° C.

The reaction mixture is then stirred for 2 to 4 hours at 20° to 25° C. until the isocyanate band has disappeared from the IR spectrum. The polyisocyanate addition product is then dissolved in 975 ml of water. The acetone is driven off by passing nitrogen into the aqueous solution which is heated to 60° C. The aqueous solution left behind has a solids content of 44.4%, determined by evaporation of the water at 180° C.

Emulsifier 2 has a calculated molecular weight of about 2,500 and contains 175 milliequivalents structural units of the formula $NH-CO-N^\ominus-C\equiv N$ per 100 g of solids content.

PROCESS ACCORDING TO THE INVENTION

Example 1

460 g of deionised water is introduced into a 2 liter four necked flask equipped with stirrer, reflux condenser and and gas inlet and outlet. It is then thoroughly boiled in a nitrogen atmosphere and cooled to 60° C. 350 g of the 50% by weight aqueous solution of Emulsifier 1 are added to the contents of the flask and nitrogen is then passed over the contents.

A mixture of 8 g of methyl methacrylate and 8 g of n-butyl acrylate (monomer mixture I) is then rapidly added at the same time as 10.4 g of a 2% by weight aqueous ammoniacal solution of the initiator, 4,4'-azo-bis-(4-cyanopentane carboxylic acid) (initiator solution I). After a reaction time of 30 minutes, a monomer mixture of 80 g of methyl methacrylate and 80 g of n-butyl acrylate (monomer mixture II) and 102 g of a 1% by weight aqueous ammoniacal solution of 4,4'-azo-bis-(4-cyanopentane carboxylic acid) (initiator solution II) are added simultaneously but separately within 3 hours. After an additional reaction time of 2 hours, the reaction mixture is reactivated with 10.4 g of a 3% by weight aqueous ammoniacal solution of the same initiator. Polymerisation is then continued to completion for a further 5 hours. About 100 ml of water and residual monomers are then distilled off in a water jet vacuum and replaced by 100 ml of deionised water. The concentration of the aqueous dispersion is 33.9% by weight, the pH is 8.0 and the average particle diameter (determined by laser scattered light correlation spectroscopy) is 84±1 nm. No coagulate was found. The ratio by weight of monomers used to emulsifiers (solids content) is 1:1.

Examples 2 and 3

The procedure is the same as in Example 1 except that in Examples 2 and 3, the ratio by weight of monomers to emulsifier is increased to 6:4 and 7:3, respectively. Further details are shown in Table 1. The physical-chemical characteristics of the aqueous dispersions are also entered.

TABLE 1

| Contents introduced into the receiver | Example 2 | Example 3 |
|---|---|---|
| Deionised water (g) | 510 | 545 |
| Emulsifier 1 (50%) (g) | 280 | 210 |
| Monomer mixture I | | |
| Methyl methacrylate (g) | 10 | 12 |
| n-butyl acrylate (g) | 10 | 12 |
| Initiator solution I | | |
| 4,4'-azo-bis-(4-cyanopentane carboxylic acid) (g) | 0.2 | 0.2 |
| 0.5% aqueous solution of ammonia (g) | 10.2 | 10.2 |
| Monomer mixture II | | |
| Methyl methacrylate (g) | 95 | 111 |
| n-butyl acrylate (g) | 95 | 111 |
| Initiator solution II | | |
| 4,4'-azo-bis-(4-cyanopentane carboxylic acid) (g) | 1 | 1 |
| 0.25% aqueous solution of ammonia (g) | 101 | 101 |
| Reactivater solution | | |
| 4,4'-azo-bis-(4-cyanopentane carboxylic acid) (g) | 0.3 | 0.3 |
| 0.75% aqueous solution of ammonia (g) | 10.3 | 10.3 |
| Concentration (% by weight) | 34.6 | 30.6 |
| pH | 7.6 | 7.4 |
| Average particle diameter (nm) | 121 ± 2 | 181 ± 3 |
| Coagulate | — | — |

Example 4

412 g of deionised water are introduced into a 2 liter three necked stirrer flask equipped with high speed stirrer, reflux condenser and gas inlet and outlet. The water is then thoroughly boiled under an atmosphere of nitrogen and cooled to 60° C.

288 g of the 50% aqueous solution of Emulsifier 1 are then added to the contents of the receiver and nitrogen is passed over.

A monomer mixture of 130 g of styrene, 130 g of methyl methacrylate, 29 g of n-butyl acrylate, 38 g of hydroxypropyl methacrylate and 10 g of methacrylic acid and an initiator solution of 1.5 g of 4,4'-azo-bis-(4-cyanopentane carboxylic acid) and 10.5 g of N-dimethylamino ethanol in 150 g of deionised water are added simultaneously but separately within 4 hours. The reaction mixture is then stirred for 2 hours and afterwards reactivated with an initiator solution of 0.3 g of 4,4'-azo-bis-(4-cyanopentane carboxylic acid) and 0.13 g of N-dimethylamino ethanol in 10 g of deionised water. Polymerisation is then continued for a further 5 hours. About 100 ml of water and residues of monomers are distilled off under a vacuum of about 100 mbar and replaced by 100 ml of deionised water. The concentration of the aqueous dispersion is 41.4% by weight, the pH is 7.5 and the average particle diameter (determined by scattered laser light correlation spectroscopy) is 112±3 nm. The quantity of dried coagulate previously separated from the remaining dispersion by means of a polyamide filter with a mesh width of 100 μm was 7 g. The ratio by weight of monomers:emulsifier is in this Example 7:3.

Example 5

A monomer mixture of 89.5 g of styrene, 89.5 g of methyl methacrylate, 29 g of n-butyl acrylate, 119 g of hydroxypropyl methacrylate and 10 g of methacrylic acid is used as in the process described in Example 4 and under otherwise identical conditions and polymerised. The concentration of the aqueous dispersion obtained is 40.3% by weight, the pH is 7.3 and the average particle diameter is 167 nm. 10 g of dried coagulate were found. Ratio by weight of monomers:emulsifier=7:3.

Example 6

107 g of deionised water are introduced into a 500 ml three necked flask equipped with stirrer, reflux condenser, thermometer and gas inlet and outlet. The water is then thoroughly boiled under a nitrogen atmosphere and cooled to 50° C. 48 g of the 50% by weight aqueous solution of Emulsifier 1 are added to the contents of the flask and nitrogen is then passed over. A monomer mixture of 28 g of acrylonitrile and 28 g of n-butyl acrylate and an initiator solution of 0.2 g of ammonium peroxy disulphate and 4.2 g of N-dimethylamino ethanol in 15 g of distilled water as well as an activator solution of 0.04 g of the dihydrate of sodium hydroxymethane sulphinate (Rongalit C ®) in 15 g of distilled water are added simultaneously but separately to the contents of the flask within 3 hours (ratio by weight of monomers:emulsifier=7:3). The reaction mixture is then stirred for 3 hours at 50° C. and the following solutions are subsequently added separately for reactivation:

(a) 0.03 g of ammonium peroxydisulphate in 1 g of distilled water;
(b) 0.07 g of Rongalit C ® in 1 g of distilled water.

Stirring is then continued for 5 hours at 50° C. 10 ml of water and residues of monomers are distilled off under a vacuum of about 100 mbar and 10 ml of distilled water are then added to the contents of the flask.

The dispersion is filtered through a polyamide cloth with a width of mesh of 100 μm.

The concentration of the aqueous dispersion is 30.3% by weight, the pH is 7.6 and the average particle diameter is 109±1 nm. The quantity of dried coagulate was 0.1 g. This dispersion is drawn out on a degreased glass plate with a coating knife to form a liquid film 0.5 mm in thickness which is then dried in air for 48 hours. The polymer film is then cross-linked for 30 minutes at 140° C. The resistance to water is tested by the application of a drop of water to the surface of the film. Slight clouding of the polymer film is observed only after about 1 hour.

Example 7

A monomer mixture of 16.8 g of acrylonitrile and 39.2 g of n-butyl acrylate is used by the process according to Example 6 and polymerised (ratio by weight of monomers:emulsifier=7:3).

The concentration of the aqueous, coagulate-free dispersion is 30.9% by weight, the pH is 7.4 and the average particle diameter is 333±5 nm. In the "water drop test", cloudiness was observed only after about 3 hours.

Example 8

The procedure described in Example 6 was employed: 54 g of the 44.4% by weight emulsifier solution 2 in 97 g of distilled water were introduced into the reaction vessel and a monomer mixture of 28 g of styrene and 28 g of n-butyl acrylate was added and polymerisation was carried out under the same conditions as in Example 6 (ratio by weight of monomers:emulsifier=7:3).

The aqueous dispersion is free from coagulate and has a concentration of 30.2% by weight, a pH of 7.7 and an average particle diameter of 208±3 nm. In the "water drop test", cloudiness is observed only after about 3 hours.

Example 9

A monomer mixture of 16.8 g of styrene and 39.2 g of n-butyl acrylate is used and polymerised by the process of Example 8 (ratio by weight of monomers:emulsifier=7:3).

The aqueous dispersion is free from coagulate and has a concentration of 29.9% by weight, a pH of 7.6 and an average particle diameter of 188±2 nm.

In the "water drop test", cloudiness is only observed after about 3 hours.

Examples 10 and 11 (use according to the invention)

Coating compounds ready for use are prepared in the following examples of practical application 10 and 11 from the dispersions according to the invention prepared as described in Examples 4 and 5:

|  | Example 10 | Example 11 |
| --- | --- | --- |
| Example 4, 41.4% in water | 87.0 | —% |
| Example 5, 40.3% in water | — | 87.2% |
| Surface active agent[1], 10% in water | 2.6 | 2.6% |
| Levelling agent[2], 50% of the marketed product | 1.3 | 1.3% |
| Deaerating agent[3], 32% of the marketed product | 0.9 | 0.9% |
| Ethyl diglycol | 4.1 | 4.09% |
| Butyl diglycol | 4.1 | 4.0% |
| Solids content | 37.2 | 36.4% |
| Outflow time (DIN 53 211, 4 mm cup) | 16 | 19s |
| pH | 8.7 | 8.4 |

[1]Fluorotensid FT 929, trade product of Bayer AG
[2] ®Byk 301, trade product of Byk-Chemie GmbH
[3] ®Additol XW 393, trade product of Hoechst AG Test sheets were coated with the coating compounds mentioned. After deaeration at room temperature for 5 minutes, the coats are predried for 15 minutes at 80° C. and then stoved for 20 minutes at 140° C. Clear coatings with perfect levelling, high brilliance, excellent mechanical film properties and good chemical resistance are obtained.

|  | Example 10 | Example 11 |
| --- | --- | --- |
| Layer thickness | 40 | 45 μm |
| Pendulum hardness (DIN 53 157) | 169 | 180s |
| Erichsen cupping (DIN 53 156) | 10.5 | 10.5 mm |
| Water resistance 24 hours under load | Unchanged | Unchanged |
| Resistance to ethanol, 10 minutes under load | Unchanged | Unchanged |
| Resistance to Xylene, 10 minutes under load | Unchanged | Unchanged |

What is claimed is:

1. In an improved process for the preparation of aqueous dispersions of polymers by polymerization of olefinically unsaturated monomers in an aqueous medium in the presence of radical formers and emulsifiers, the improvement comprises said emulsifiers being polyisocyanate addition products having a molecular weight below 20,000 and containing from 5 to 1000 milliequivalents of anionic structures corresponding to the following formula

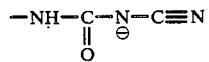

incorporated therein per 100 g of solids content.

2. Process according to claim 1 wherein the ratio by weight of olefinically unsaturated monomers to emulsifiers is from 0.1:1 to 20:1.

3. Process according to claim 1 wherein the olefinically unsaturated monomers are a mixture containing a quantity of monomers containing hydroxyl groups such that the mixture contains 0.5 to 8% by weight of hydroxyl groups.

4. Process according to claim 1 wherein the emulsifiers are oligo urethanes in the molecular weight range of from 500 to 10,000 containing, per molecule, at least two anionic structural units.

* * * * *